United States Patent [19]

Furukawa et al.

[11] Patent Number: 5,028,775
[45] Date of Patent: Jul. 2, 1991

[54] OPTICAL TIME DOMAIN REFLECTOMETER USING OPTICAL ELEMENT WITH THREE CONTROL MODES OF OSCILLATION, ATTENUATION AND AMPLIFICATION

[75] Inventors: Hiroshi Furukawa, Isehara; Koichi Sasao, Ebina, both of Japan

[73] Assignee: Anritsu Corporation, Tokyo, Japan

[21] Appl. No.: 543,971

[22] Filed: Jun. 26, 1990

[30] Foreign Application Priority Data

Jun. 30, 1989 [JP] Japan .................................. 1-169186

[51] Int. Cl.$^5$ .......................... H01J 5/16; G01N 21/00
[52] U.S. Cl. ................................ 250/227.15; 356/73.1
[58] Field of Search ....................... 250/227.14, 227.15, 250/227.16, 231.1, 227.11; 356/73.1

[56] References Cited

U.S. PATENT DOCUMENTS 4,070,118  1/1978  Maslowski et al. ................. 356/73.1
4,548,494  10/1985  Geckeler et al. .................... 356/73.1

FOREIGN PATENT DOCUMENTS 0138623  4/1985  European Pat. Off. ............ 356/73.1

OTHER PUBLICATIONS

P. Healey, "OTDR in Monomode Fibres at 1.3 μm Using a Semiconductor Laser", Electronics Letters, vol. 17, No. 2, 1/81, pp. 62-64.
The Transactions of the IEICE, Saitoh et al., "Structural Design of Polarization Insensitive 1.55 μm Traveling Wave Semiconductor Laser Amplifier", vol. E71, No. 5, May 1988, pp. 482-484.
Suzuki et al., "Optical Time-Domain Reflectometer with a Semiconductor Laser Amplifier", Electronics Letters, 30th Aug. 1984, vol. 20, No. 18, pp. 714-716.
Saitoh et al., "1.5 μm GaInAsP Traveling-Wave Semiconductor Laser Amplifier", IEEE Journal of Quantum Electronics, vol. QE-23, No. 6, Jun. 1987, pp. 1010-1020.

Primary Examiner—David C. Nelms
Assistant Examiner—Michael Messinger
Attorney, Agent, or Firm—Frishauf, Holtz, Goodman & Woodward

[57] ABSTRACT

An optical element has three operation modes of light oscillation, light amplification, and light attenuation, which are switched in accordance with the intensity of an excitation component. The optical element having a first light terminal from which a light pulse is output to an optical fiber to be tested, and a second light terminal through which reflected light from the optical fiber is passed in the amplification mode or in the attenuation mode. Light-receiving section receives the reflected light output from the second light terminal of the optical element, and converts the reflected light into an electric signal. Signal processing section subjects the electric signal output from the light-receiving section to a predetermined signal processing step for testing the optical fiber. Excitation component control section outputs to the optical element a first excitation component for enabling the optical element to operate in the oscillation mode at a first timing, a second excitation component for enabling the optical element to operate in the attenuation mode at a second timing subsequent to the first timing, and a third excitation component for enabling the optical element to operate in the amplification mode at a third timing subsequent to the second timing.

10 Claims, 9 Drawing Sheets

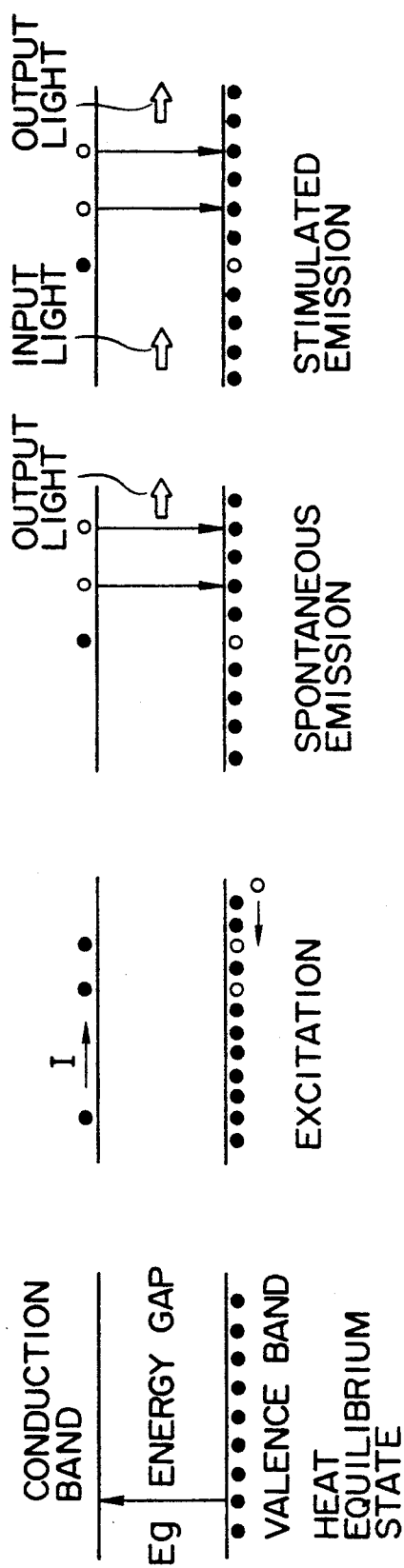

OPTICAL TIME DOMAIN REFLECTOMETER USING OPTICAL ELEMENT WITH THREE CONTROL MODES OF OSCILLATION, ATTENUATION AND AMPLIFICATION

BACKGROUND OF THE INVENTION

1. Field of the Invention

The present invention relates generally to an optical time domain reflectometer (hereinafter, referred to as "OTDR"), and more particularly to an OTDR using an optical element with three control modes of oscillation, attenuation and amplification.

More specifically, this invention relates to an OTDR for measuring transmission characteristics of an optical fiber and, for example, identifying the location of a fault in an optical fiber transmission path. In particular, in this invention, when a test light pulse is generated, an optical element is used as a light source. When a pulse refected from an optical fiber is received, the optical element is used as a light amplifier or a light attenuator. According to the OTDR of this invention, saturation of a light receiver due to Fresnel reflection can be prevented, and Rayleigh scattering light can be measured.

2. Description of the Related Art

In a typical OTDR, an acoustic/optical element (A/O element) with small loss is provided between an light source, an optical fiber, and a receiver, thereby changing the light path. This A/O element, however, is expensive, and optical alignment between a transmission path and a reception path is difficult.

U.S. Pat. No. 4,070,118 discloses an OTDR wherein an optical element (e.g. laser) is employed as an oscillator or an amplifier, without providing an A/O element. This OTDR will now be described with reference to FIG. 1. When a laser 61 is supplied with a current pulse, exceeding an oscillation limit value, it generates a test pulse. The test pulse 65 is applied to a light transmission body 62. On the other hand, a light pulse 66 is generated from the laser 61 and is applied to a light receiver 64 thereby marking a zero point on a time scale. After the test pulse is generated, the laser 61 lowers its operation current slightly below the oscillation limit value, in order to perform an amplification function. A reflected pulse 67 reflected from a fault point of the light transmission body 62 is optically amplified by the laser 61 when it passes through the laser 61. The amplified pulse 67 is applied to the light receiver 64. The light pulses 66 and 67 input to the light receiver 64 are converted to electric signals, and the electric signals reach outputs A. The signals output from the light receiver 64 are observed by an oscilloscope (not shown in FIG. 1) or are recorded on a recording device.

The conventional OTDR shown in FIG. 1 has the problem, as is explained by referring to FIG. 2.

Recently, there has been a considerable demand for an OTDR capable of measuring Fresnel reflection light and Rayleigh scattering light, that is, for detecting a fault point of an optical fiber and transmission characteristics. The conventional OTDR shown in FIG. 1, however, is designed mainly to measure Fresnel reflection light, and is not designed to measure Rayleigh scattering light. Thus, if this conventional OTDR is employed to measure both Fresnel reflection light and Rayleigh scattering light, the Rayleigh scattering light (indicated by a broken line D in FIG. 2) is masked (as shown by a solid line C in FIG. 2) and cannot be measured.

In general, in this type of apparatus, the laser 61 and the light transmission body 62 are coupled by a connector (not shown). The reflected light passing through the laser 61 includes a Fresnel's reflection light component (denoted by B in FIG. 2), a Fresnel's reflection light component (denoted by C in FIG. 2) and a Rayleigh scattering light component occurring at the fault point 63. In particular, the Fresnel's reflection light has a high power and is amplified through the laser 61, thus saturating the light receiver 64. Once the light receiver 64 is saturated, it takes a considerable amount of time for the light receiver 64 to be restored to the normal state. Consequently, the OTDR shown in FIG. 1 fails to observe a peculiar point existing just after the connector or the fault point 63 (e.g. component D in FIG. 2, or a slight loss due to a welded point for connection of an extended light transmission body).

SUMMARY OF THE INVENTION

It is, therefore, an object of the present invention to provide a new and improved optical time domain reflectometer with three control modes of oscillation, attenuation and amplification for an optical element This optical time domain reflector can prevent the saturation of a light-receiver due to Fresnel's reflection, and can test Rayleigh scattering light.

According to the present invention, there is provided an optical time domain reflectometer which comprises:

an optical element having three operation modes of light oscillation, light amplification, and light attenuation, which are switched in accordance with the intensity of an excitation component, said optical element having a first light terminal from which a light pulse is output to an optical fiber to be tested in the oscillation mode, and a second light terminal through which reflected light from the optical fiber is passed in the amplification mode or in the attenuation mode;

light-receiving means for receiving the reflected light output from the second light terminal of the optical element, and converting the reflected light into an electric signal;

signal processing means for subjecting the electric signal output from the light-receiving means to a predetermined signal processing step for testing the optical fiber; and excitation component control means for outputting to the optical element a first excitation component for enabling the optica element to operate in the oscillation mode at a first timing, a second excitation component for enabling the optical element to operate in the attenuation mode at a second timing subsequent to the first timing, and a third excitation component for enabling the optical element to operate in the amplification mode at a third timing subsequent to the second timing.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 4A, 4B, 4C and 4D are views for explaining the principle of the operation of the SLA shown in FIGS. 3A and 3B, and in particular illustrates the energy level and the transition process in a semiconductor;

DETAILED DESCRIPTION OF THE PREFERRED EMBODIMENTS

Figure 1:
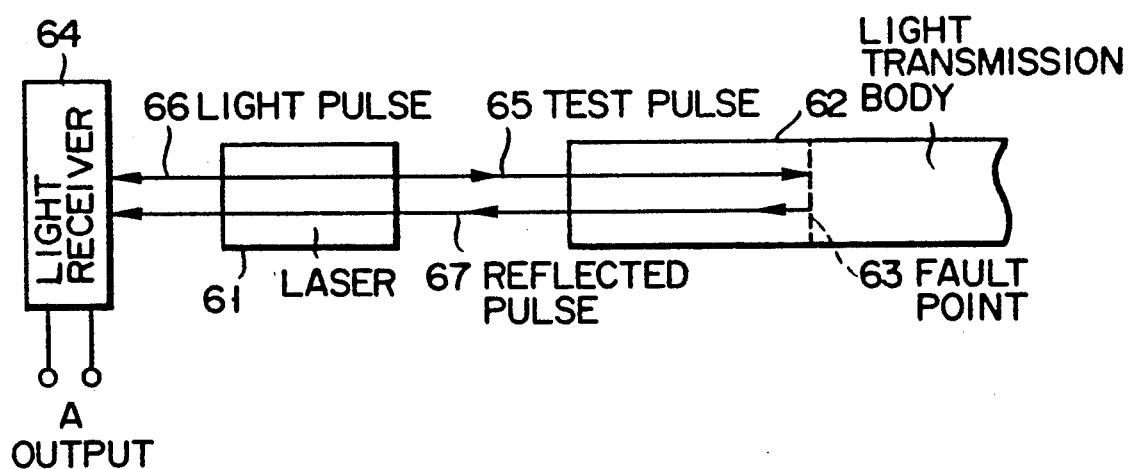
FIG. 1 is a block diagram showing a structure of a conventional OTDR.

Reference will now be made in detail to the presently preferred embodiments of the invention as illustrated in the accompanying drawings, in which like reference characters designate like or corresponding parts throughout the several drawings.

In order to achieve the aforementioned object, an optical time domain reflectometer (OTDR) of the present invention comprises an optical element, which may function as a light source (third mode) at the time of generating light pulses and may function as a light amplifier (second mode) or a light attenuator (first mode) at the time of receiving reflected light travelling through an optical fiber, and a control unit for setting the optical element to a desired one of the three modes.

First, a detailed description will be made of the optical element which may function as a light source at the time of generating test light pulses and may function as a light amplifier or a light attenuator at the time of receiving reflected light travelling through an optical fiber to be tested.

Figure 3A:
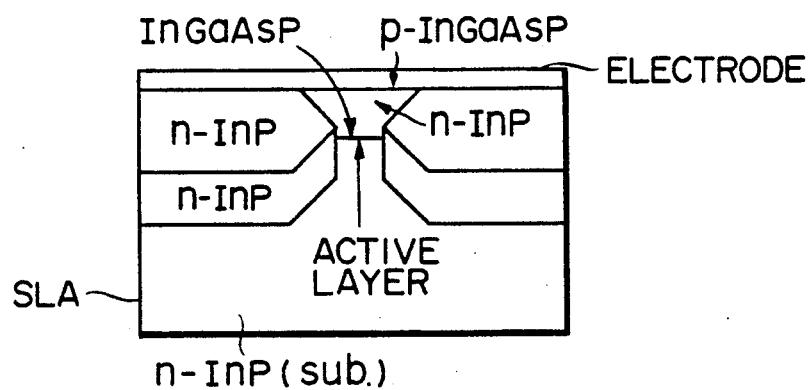
FIGS. 3A and 3B show a structure of an SLA (semiconductor laser amplifier) employed in a first embodiment of the present invention.
Figure 3B:
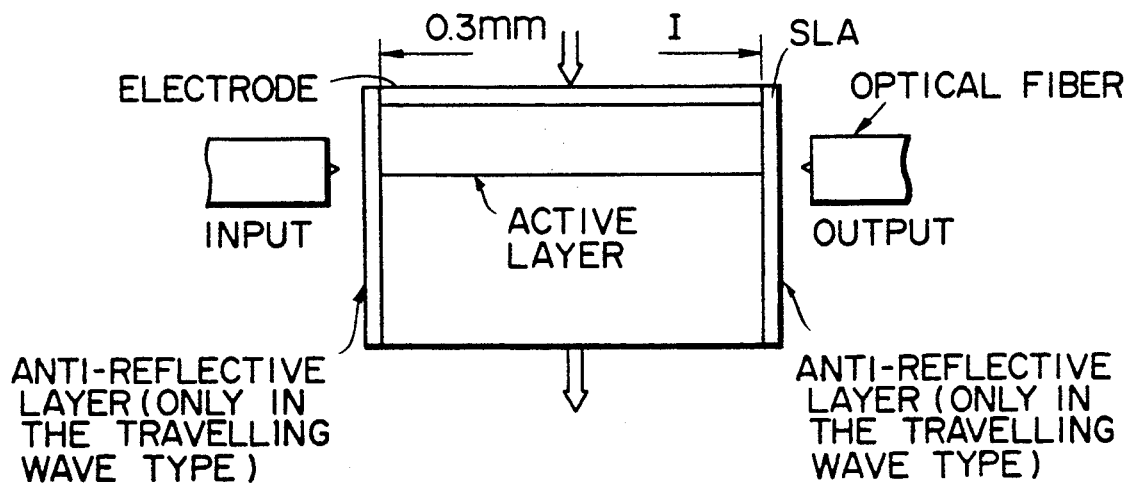
Figure 5:
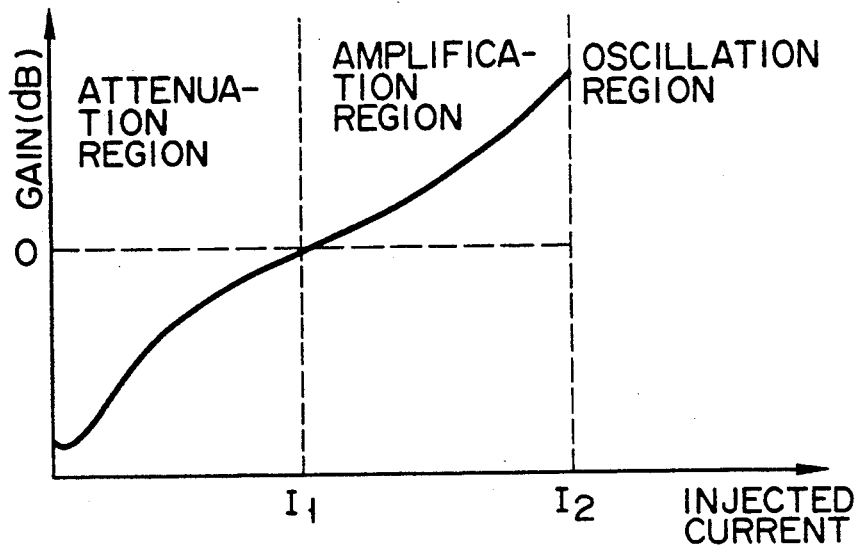
FIG. 5 is a view for explaining the principle of the operation of the SLA shown in FIG. 3, and in particular shows characteristics of the optical element.

The optical element is generally called a light amplifier. A typical light amplifier is a semiconductor laser amplifier (SLA). FIGS. 3A and 3B are a transverse cross-sectional view and a longitudinal cross-sectional view of the SLA. FIGS. 4A to 4D illustrate the transition process in a semiconductor. FIG. 5 shows an excitation current versus light gain characteristic of the SLA.

The SLA shown in FIGS. 3A and 3B is constituted such that first, second and third n-InP layers are successively formed on an n-InP substrate, an InGaAsP (active layer) is formed in the first to third n-InP layers, and finally a P-InGaAsP electrode is formed.

Consideration will now be given to the transition of electrons in the case where an injected current I is input from the electrode of the SLA shown in FIGS. 3A and 3B. When the current value is zero, a heat equilibrium state occurs. All electrons indicated by black circles in FIG. 4A exist in a valence band, and no electrons exist in a conduction band which is separated from the valence band with an energy gap. As the injected current is input from the electrode of the SLA, an electric current concentrates in a region called an activation layer in the SLA. The electrons in this region are pumped from the valence band to the conduction band (FIG. 4B). This state differs from a natural electron distribution or a heat equilibrium state, and is called an inverted distribution. The excited electrons return to the original valence band, and excessive energy is emitted as light (FIG. 4C). This state is called a spontaneous emission. On the other hand, in the state of the inverted distribution, when light having energy greater than Eg is input from the outside, light in phase with the input light is emitted and the electrons fall to the valence band (FIG. 4D). This phenomenon is called stimulated emission. Making use of the stimulated emission, the SLA amplifies light. The stimulated emission light has a coherent amplification characteristic in relation to the input light.

This type of SLA is disclosed, for example, in IEEE Journal of Quantum Electronics, Vol. QE-23, No. 6, pp. 1010–1020. According to this document, the light power transmission coefficient G of the SLA is given by:

$$G = [(1 - R_1)(1 - R_2)Gs]/[1 - \sqrt{(R_1 \cdot R_2)} \cdot Gs)^2 + 4Gs\sqrt{(R_1 \cdot R_2)} \cdot \sin^2[\pi(\nu - \nu_0)/\Delta\nu]] \quad (1)$$

where $R_1$ and $R_2$ are input and output facet reflectivities, respectively, $\nu$ is the frequency of input light, $\Delta\nu$ is the free spectral range (FSR) of the SLA, and $\nu_o$ is the Fabry-Perot resonance frequency. In this invention, since oscillation and amplification are carried out by the same element, $\nu$ may be equal to $\nu_o$. Thus, the equation (1) can be rewritten as follows $$G = [(1 - R_1)(1 - R_2)Gs]/[(1 - \sqrt{(R_1 \cdot R_2)} \cdot Gs)^2] \quad (2)$$

where Gs is a single pass gain, and is given by:

$$Gs = \exp[(\Gamma g - \alpha)L] \quad (3)$$

where $\Gamma$ is an optical mode confinement factor, $\alpha$ is a model absorption coefficient, and L is a length of the SLA. A gain coefficient g is represented by:

$$g = Ag(Ne - No) \quad (4)$$

where Ne is an injection carrier density proportional substantially to an injected current of the SLA, and Ag and No are constants. From these equations, it follows that, when the injected current or injected carrier density Ne increases, the gain coefficient g increases according to equation (4), and consequently the single pass gain Gs increases according to equation (3). In addition, the light power transmission coefficient G increases according to equation (2).

Thus, the SLA takes the three modes (regions) of attenuation, amplification and oscillation, in accordance with the injected current. Referring to the characteristic diagram of FIG. 5, the three modes wil now be described, with the above equations being employed.

In FIG. 5, the attenuation region (first mode) is the region where the excitation current is $I_1$ or less (e.g. 40 mA). In this region, the injected current or the injected carrier density Ne is small. Thus, the gain coefficient g according to equation (4) is small. Accordingly, in equation (3), $\Gamma g - \alpha < 0$, that is, $Gs < 1$. For the purpose of simplicity of description, suppose that $R_1 = R_2$. In this case, the value of G is lower than 1, according to equation (2), and the attenuation mode is attained.

In FIG. 5, the amplification region (second mode) is the region where the injected current is in a range of $I_1$ to $I_2$ or less (e.g. 150 mA). In this region, the excitation current or the injected carrier density Ne is relatively large. Thus, the gain coefficient g according to equation (4) is large. Accordingly, in equation (3), $0 < \Gamma g - \alpha$, that is, $1 < Gs$. For the purpose of simplicity of description, suppose that $R_1 = R_2$. In this case, according to equation (2), $1 < G < \infty$, and the amplification mode is attained.

In FIG. 5, the oscillation region (third mode) is the region where the injected current is $I_2$ or more. In this region, the injected current or the injected carrier density Ne is further large. Thus, the gain coefficient g according to equation (4) is also further large Accordingly, in equation (3), $0 < < \Gamma g - \alpha$, that is, $1 < < Gs$. If $1 = \sqrt{(R_1 \cdot R_2)} \cdot Gs$, the denominator of equation (2) is zero and $G = \infty$. Thus, the oscillation mode is attained.

Figure 6:
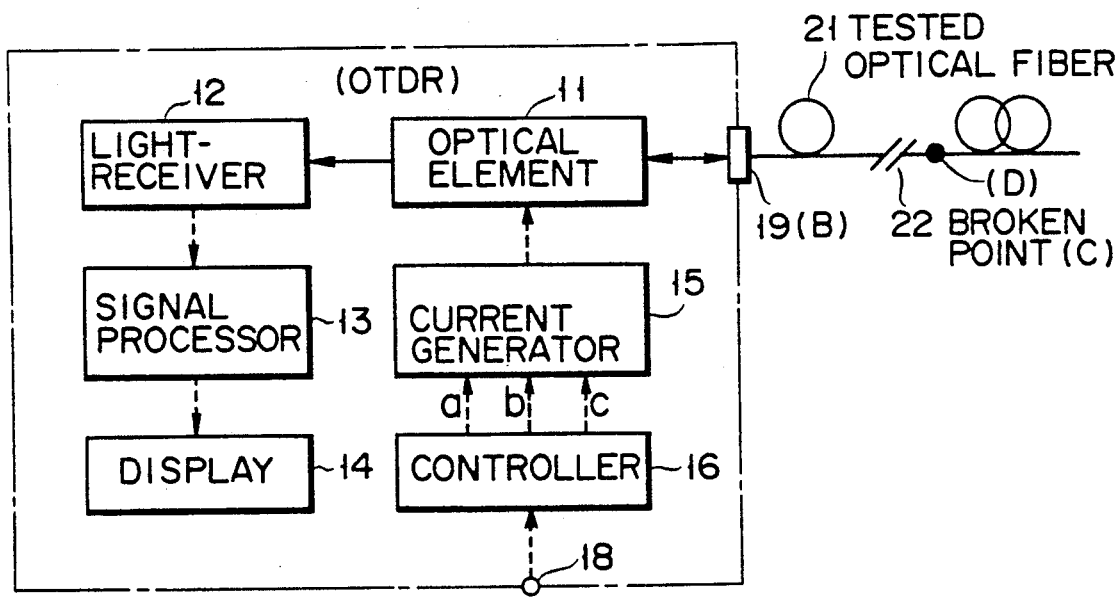
FIG. 6 is a block diagram showing a first embodiment of the OTDR according to the present invention.
Figure 7:
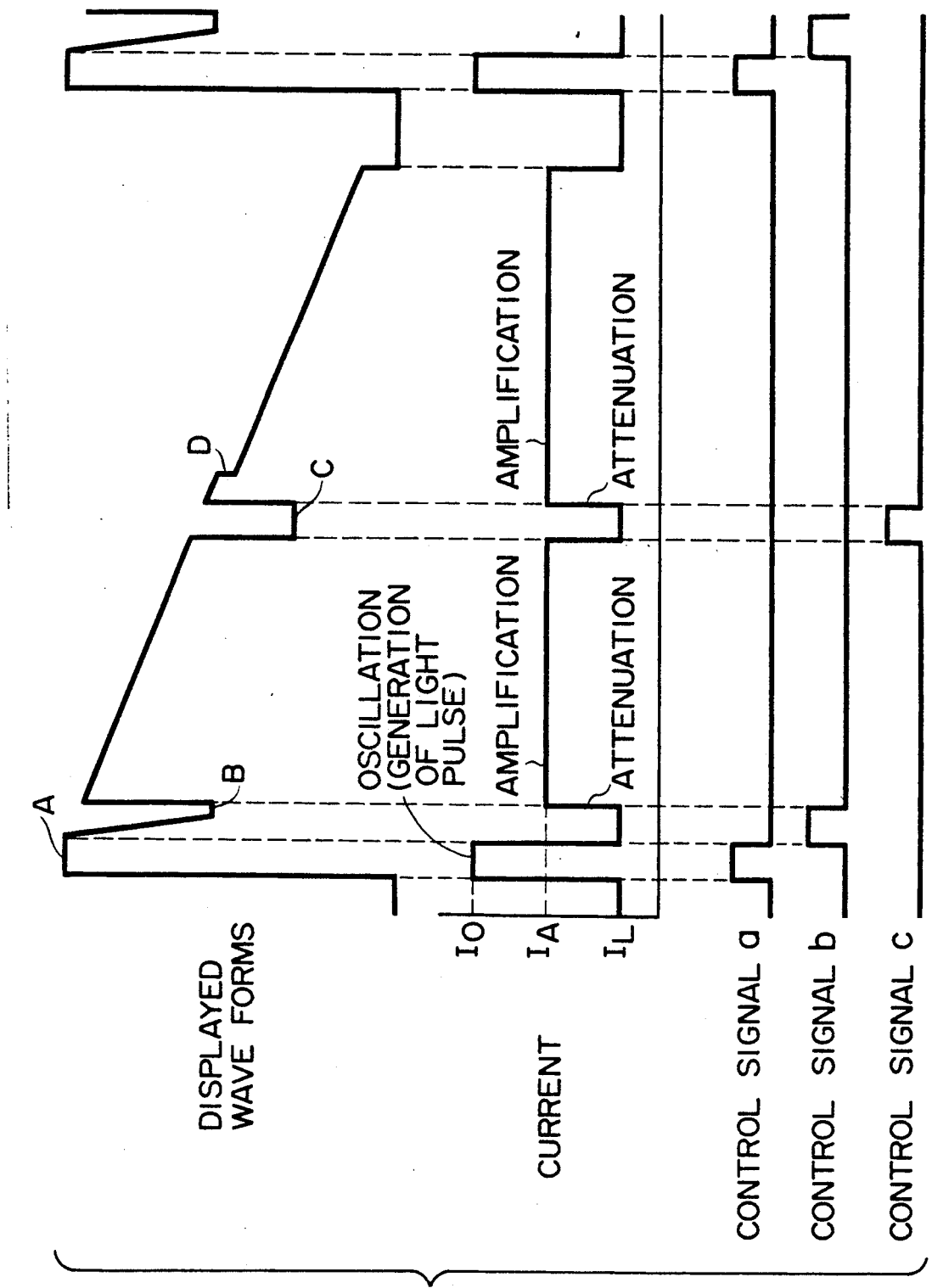
FIG. 7 is a timing chart for explaining the operation of the first embodiment of the invention.

Next, some embodiments of the present invention will now be described with reference to the accompanying drawings. FIG. 6 is a block diagram showing a first embodiment of the present invention, and FIG. 7 is a timing chart relating to the first embodiment.

Referring to FIG. 6, a structure of the first embodiment will now be described. An optical element 11 functions as a light source, a light amplifier, or a light attenuator in the above-described SLA. The mode of operation of the optical element 11 depends on the intensity of the current applied to a current input terminal. A first light terminal of the optical element 11 is connected to an optical connector 19, and a second light terminal thereof is connected to a light-receiver 12. The light-receiver 11 converts a light signal from the optical element 11 to an electric signal, and sends the electric signal to a signal processor 13. The signal processor 13 includes an amplifier, an A/D converter, a memory unit, etc. The signal processor 12 processes a signal from the light-receiver 12 and sends the processed signal to a display 15. On the other hand, a controller 16 includes a CPU and its peripheral circuit and functions to generate control signals a and b. In addition, in response to a command applied to a terminal 18, the controller 16 outputs a control signal c. The control signals generated from the controller 16 are input to a current generator 15. Based on the control signals from the controller 16, the current generator 15 generates a current which enables the optical element 11 to operate in a desired mode. The output from the current generator 15 is applied to the optical element 11. The optical connector 19 is coupled to an optical fiber 21. Numeral 22 denotes a broken point or the like (including a welded point for connection of an extended fiber, a line connection point using a connector, etc.).

The operation of the OTDR having the above structure will now be described with reference to FIG. 7.

When the current generator 15 receives the control signal a from the controller 16, it generates a current IO and sets the optical element 11 in the oscillation mode (third mode). Namely, the optical element 11 generates light pulses and applies them to the optical fiber 21 and the light-receiver 12. In this case, the output from the light-receiver 12 has a displayed waveform A, as shown in FIG. 7.

When the current generator 15 receives the control signal b from the controller 16, it generates a current $I_L$ thereby setting the optical element 11 in the attenuation mode (second mode). When Fresnel's reflection light from the optical connector 19 passes through the optical element 11, the reflection light is attenuated by the light-receiver 12, as is indicated by a displayed waveform B in FIG. 7. Subsequently, the current generator 15 generates a current $I_A$ which enables the optical element 11 to operate in the amplification mode.

The controller 16 generates the control signal c in response to the command applied to its terminal 18. The control signal c may be generated at a given time point on a time-base axis. If necessary, a plurality of control signals c may be generated. Upon receiving the control signal c, the current generator 15 generates the current $I_L$ which enables the optical element 11 to operate in the attenuation mode. Thus, when Fresnel's reflection light from the broken point 22 passes through the optical element 11, the optical element 11 attenuates the reflection light thereby preventing the saturation of the light-receiver 12. In this case, the output from the light-receiver 12 is as is shown by a displayed waveform C in FIG. 7. Thus, a peculiar point existing just after the broken point 22 of the optical fiber 21 can be exactly observed, as is shown by a displayed waveform D in FIG. 7.

Figure 2:
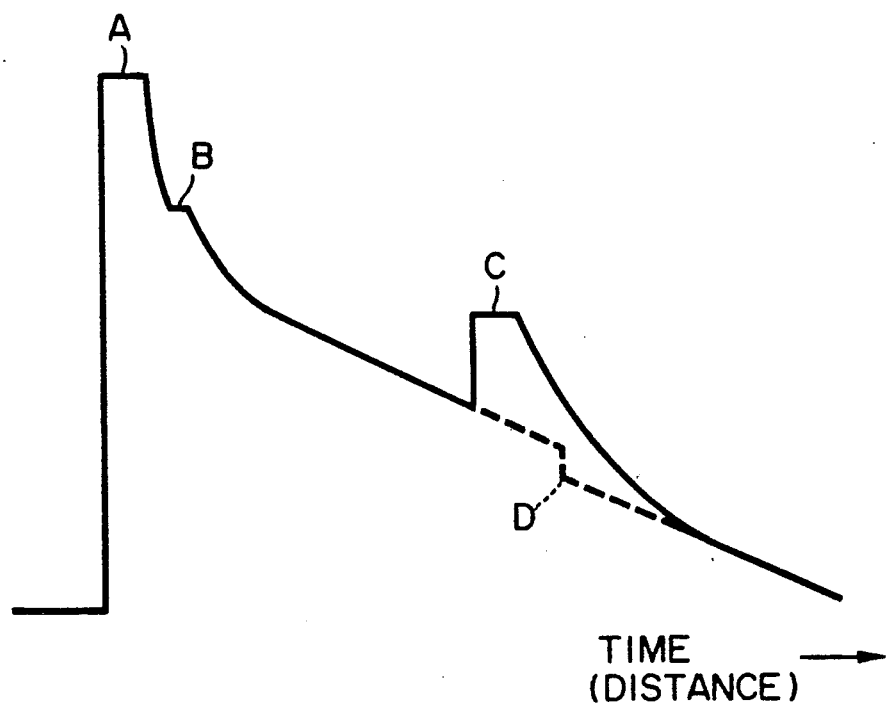
FIG. 2 shows a sample of a graph displayed by the conventional OTDR.

The signal processor 13, in fact, comprises a first amplifier, a second amplifier, a variable-resistance attenuator, an A/D converter, a data processing unit, a memory unit, an operating unit, etc. These elements are described in detail in U.S. Pat. No. 4,893,006, the assignee of which is identical to that of the present application. The description of the U.S. Patent, relating in particular to FIGS. 1 and 2, is incorporated herein.

A problem, which may occur in the above-described embodiment, can be solved in the following manner.

When the optical element 11 is set in the oscillation mode, the oscillation output is applied also to the light-receiver 12, and the light-receiver 12 may be saturated. One technique of solving this problem is that the reflectivity $R_1$ of that end portion of the SLA, which faces the light-receiver 12, is made higher than the reflectivity $R_2$ of that end portion of the SLA, which faces the tested optical fiber. This technique enables that a light output from a facet of SLA near the light-receiver side is suppressed lower than a light output from a facet of SLA near the fiver-side. For example, this technique is disclosed in the Technical Report (OQE82-125, pp. 51-57) of the Institute of Electronics, Information and Communications Engineering. According to this report, the relationship between the optical outputs $P_1$ and $P_2$ and the reflectivities $R_1$ and $R_2$ of both end portions of the SLA is represented by:

$$P_1/P_2 = \sqrt{(R_1/R_2)} \cdot (1 - R_2)/(1 - R_1) \qquad (5)$$

If the value of $R_1 \times R_2$ is constant, substantially the same gain is obtained in the case of $R_1 = R_2$ and in the case of $R_1 \neq R_2$, as can be seen from equation (2).

Figure 8:
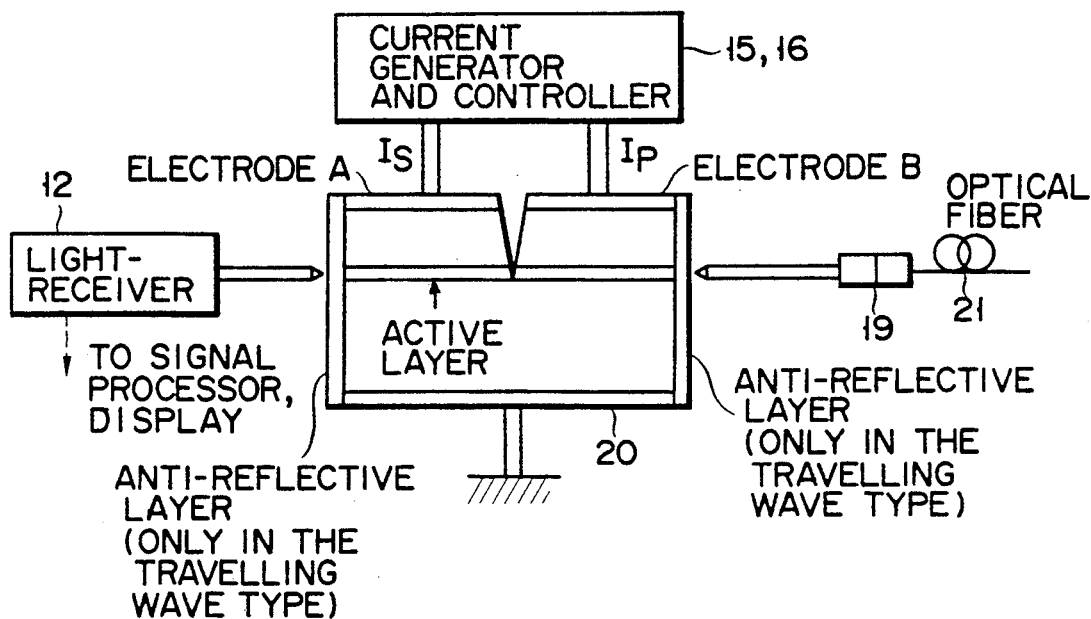
FIG. 8 is a view for explaining a structure of an important portion of a second embodiment of the invention, wherein a two-part SLA is employed.
Figure 9:
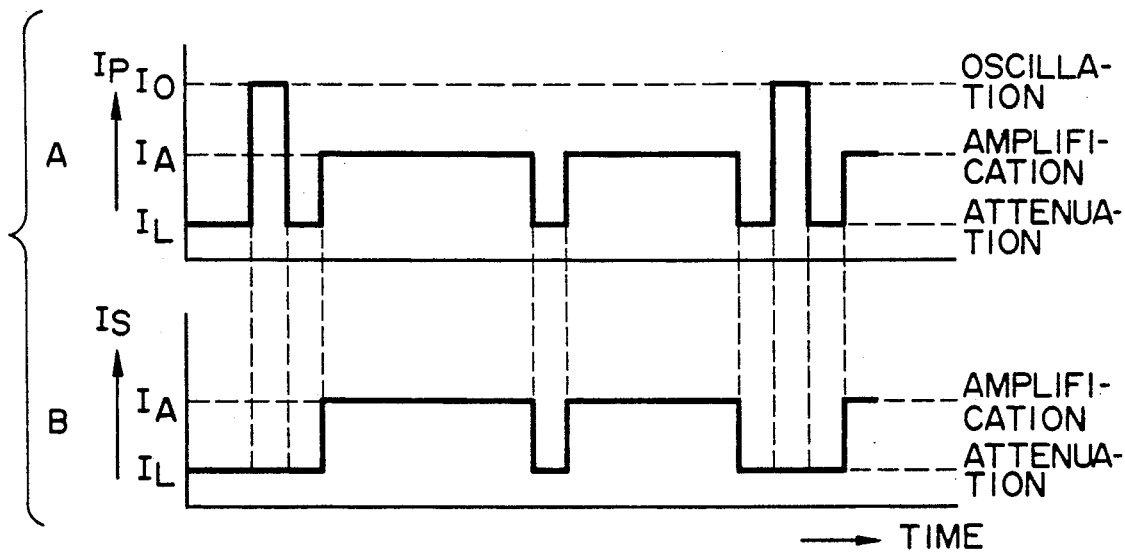
FIG. 9 is a timing chart for explaining the operation of the second embodiment of the invention.

In another technique for solving the aforementioned problem, a two-part SLA, according to a second embodiment of the invention shown in FIG. 2, may be used as the optical element 20. In the oscillation mode, the controller 16 applies a current Ip higher than an oscillation threshold to an electrode B of the SLA which is closer to the tested optical fiber and enables the electrode B to oscillate. In this case, a current Is is not applied from the controller 16 to an electrode A of the SLA closer to the light-receiver 12; therefore, light output to the light-receiving element employed in the light-receiver is absorbed, and the light-receiving element is not saturated. In the attenuation mode, neither current Ip nor Is is applied to each electrode, and unnecessary reflected light from the tested optical fiber is attenuated. In the amplification mode, currents Ip and Is are applied to both electrodes, thereby amplifying desired reflected light. FIG. 9 is a timing chart of currents Ip and Is generated in the second embodiment shown in FIG. 8.

Regarding the first embodiment shown in FIG. 6, when it is necessary to shut off the light pulse to the light-receiver 12, a light path disconnecting unit (not shown) such as an acousto-optical deflector may be provided between the optical element 11 and the light-receiver 12, thereby to shut off the light pass in response to the control signal a.

There is another problem wherein the plane of polarization of reflected light from the tested optical fiber varies irregularly with the passing of time. It is thus desirable that the dependency of the optical element 11 upon polarization be as low as possible. A technique of reducing the dependency of the SLA upon polarization is disclosed, for example, in the Transactions of the IEICE, Vol. E71, No. 5, pp. 482-484. A rare-earth doped fiber laser amplifier having low dependency upon polarization is particularly desirable, as is stated in the Technical Report (OQE89-18, pp. 55-60) of the Institute of Electronics, Information and Communications Engineering.

Figure 10:
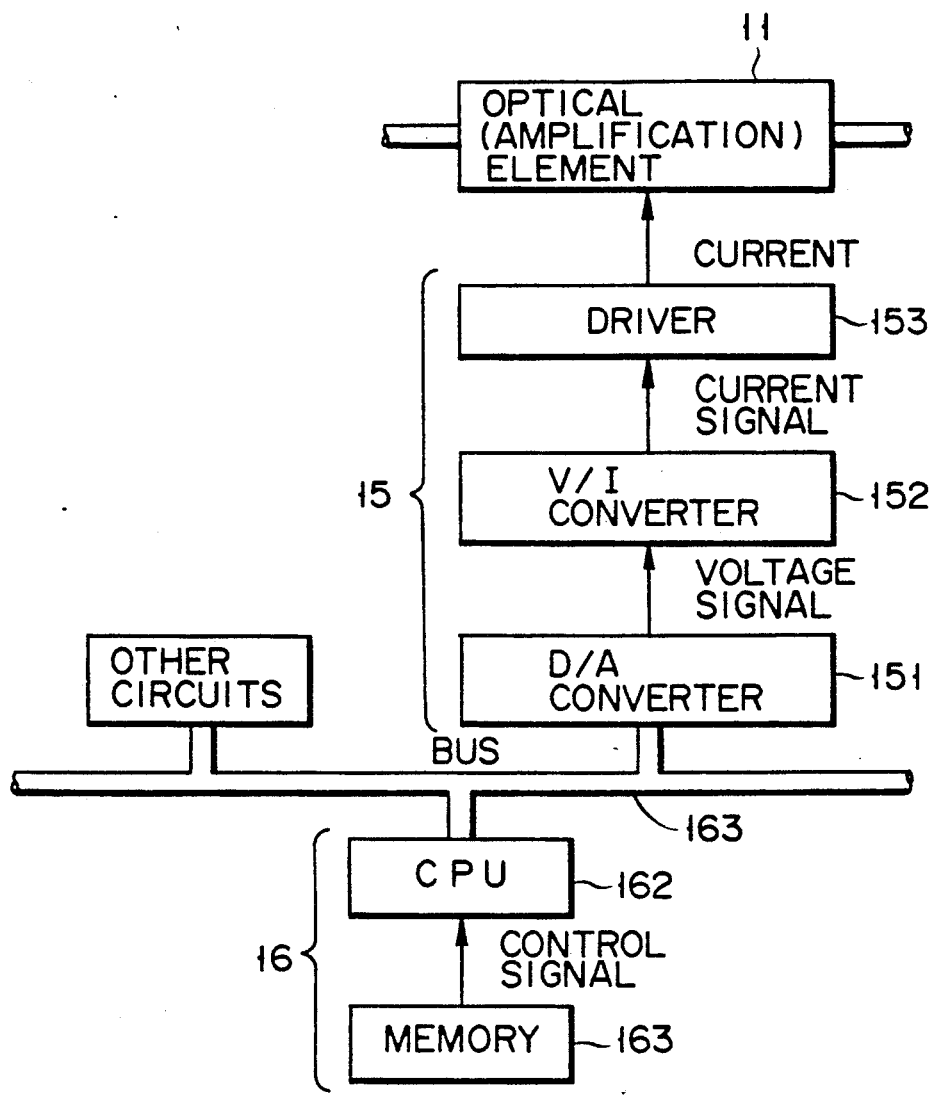
FIG. 10 shows an example of the structures of a control unit and an excitation current generator unit employed in the present invention.

FIG. 10 shows an example of the structure of the controller 16 and the current generator 15 employed in the above embodiments.

A memory 161 stores a control program and a control pattern. The control pattern corresponds, for example, the control signals shown in FIG. 6. A control signal output from the memory 161 is input to a CPU 162, and is converted to a command in the CPU 162. The CPU 162 may be a general-purpose microprocessor. The command output from the CPU 162 is applied to a D/A converter 151 through a bus 163 and is converted to an analog signal. The D/A converter 151 may be constituted, for example, by an RTI-602 D/A converter board (manufactured by ANALOG DEVICES). Since the resultant analog signal is a voltage signal, it is applied to an V/I converter and is converted to a current signal. The V/I converter 152 is constituted, for example, by a V/I converter OA08 (manufactured by ANALOG DEVICES). A maximum output current of the V/I converter OA08 is 20 mA, and it is insufficient to directly control a light amplifier. Thus, a driver 153 must be provided. The driver 153 may be a general-purpose middle/large power transistor. The structure of the controller 16 and the current generator 15 is not limited to this example.

If it is designed that the signal from the light-receiver is fed back to the controller, the gain at the saturation point can be automatically reduced, and the operator's work load is greatly reduced.

In view of the subject matter of the invention, it can be said that the optical element is not limited to the SLA, and it may be replaced with other type of light amplifier, for example, a fiber Raman amplifier or a rare-earth doped fiber laser amplifier as disclosed in the Technical Report (OQE89-18, pp. 55-60) of the Institute of Electronics, Information and Communications Engineering. In this case, the aforementioned excitation current is replaced with excitation light. The light amplifiers, including the SLA, may be of the travelling wave type (the reflectivities of both facets of the amplifier are low) or of the resonance type (the reflectivities are high).

A description will now be made of a third embodiment of the present invention, wherein an optical fiber type light amplifier (30) is employed as the optical element 30.

Figure 11:
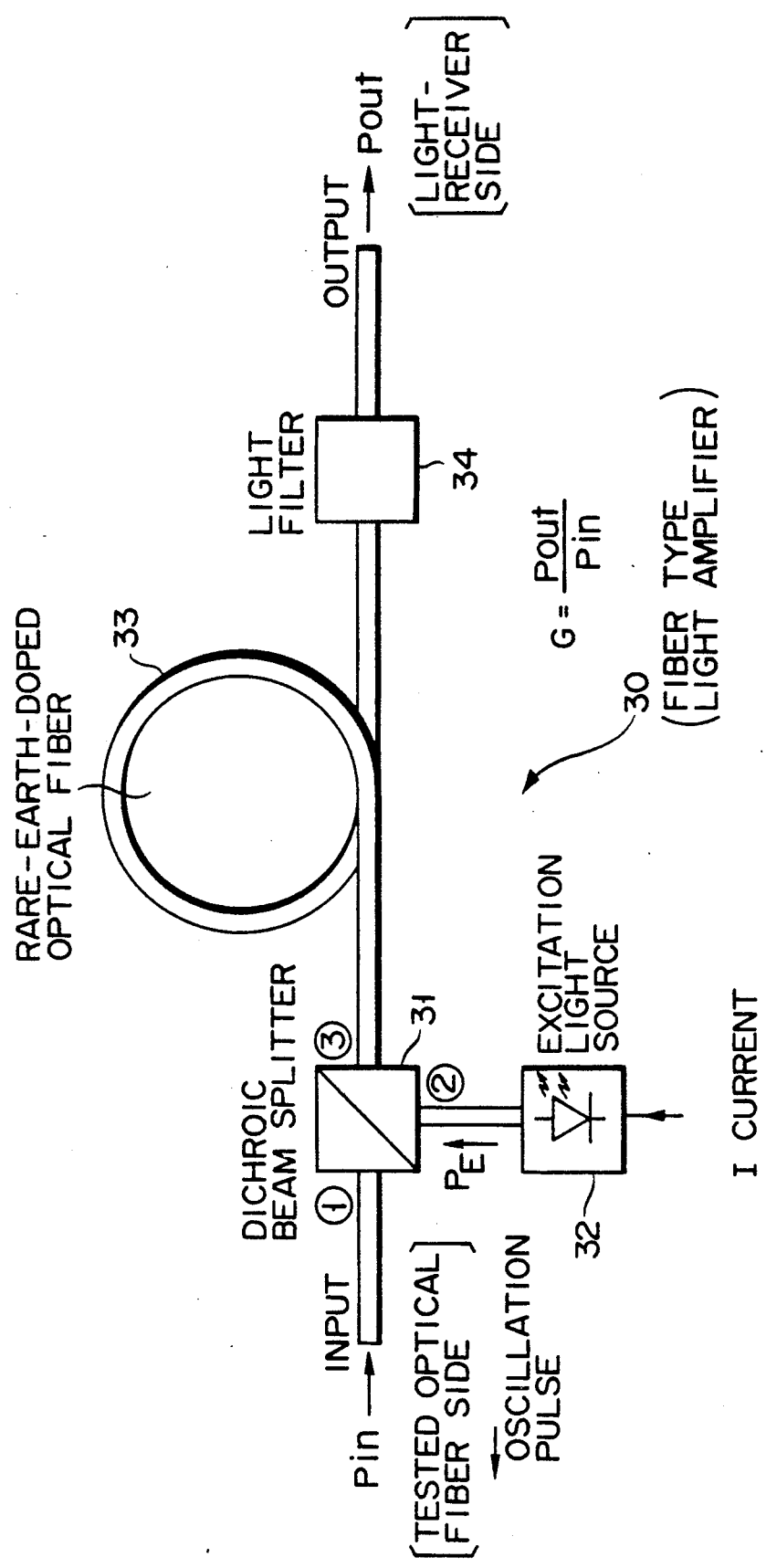
FIG. 11 shows a structure of an important portion of a third embodiment according to the present invention, wherein a fiber type light amplifier is employed.

On the basis of the principles of operation, fiber type light amplifiers are classified into the Raman type, the Brillouin type, the rare-earth doped type, etc. In the present invention, any one of the fiber type light amplifiers can be used. A rare-earth doped optical fiber type light amplifier is employed, for example, in the description that follows. Referring to FIG. 11, there is shown a rare-earth doped optical fiber type light amplifier 30. The light amplifier 30 comprises a dichroic beamsplitter 31, an excitation light source 32 connected to a port 2 of the dichroic beamsplitter 31, a rare-earth doped optical fiber 33 connected to a port 3 of the dichroic beam splitter 31, and a light filter 34 connected to the fiber 33. The dichroic beamsplitter 31 has a wavelength selection function. The path between the ports 1 and 3 has a low loss property with respect to the desired wavelength for amplification, and the path between the ports 2 and 3 has a low loss property with respect to the excitation wavelength. Thus, when signal light is applied to the port 1 and excitation light is applied to the port 2, the synthesized light thereof is output from the port 3. A rare-earth element to be added to the rare-earth doped optical fiber 33 is determined in accordance with the wavelength for amplification. When light of wavelength of 1.55 μm is amplified, erbium (Er) is doped. A semiconductor laser, which is easy to handle, is widely used as the excitation source 32. The oscillation wavelength of the semiconductor laser is determined by the rare-earth element doped to the optical fiber. In the case of use of erbium, the oscillation wavelength is 1.48 μm or 0.98 μm.

Figure 13:
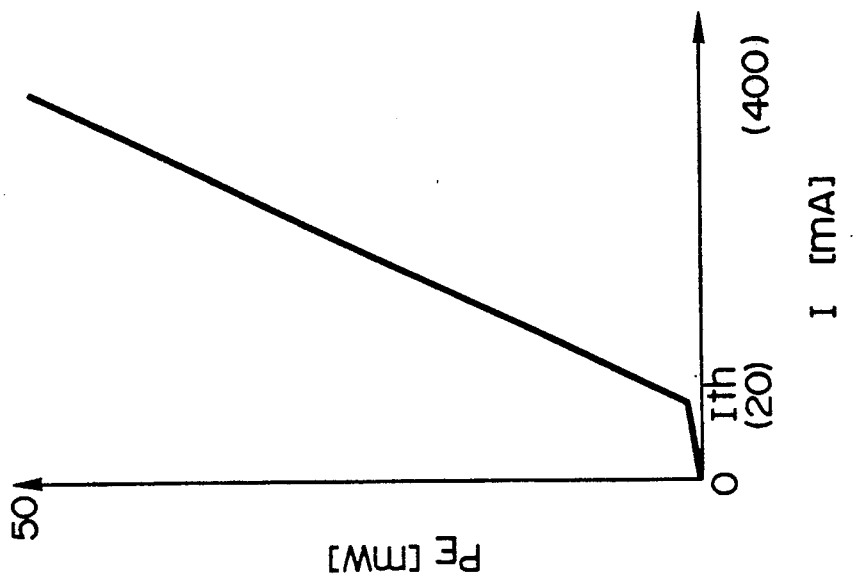
FIG. 13 shows a current versus optical output characteristic for explaining the operation of the third embodiment of the invention.
Figure 12:
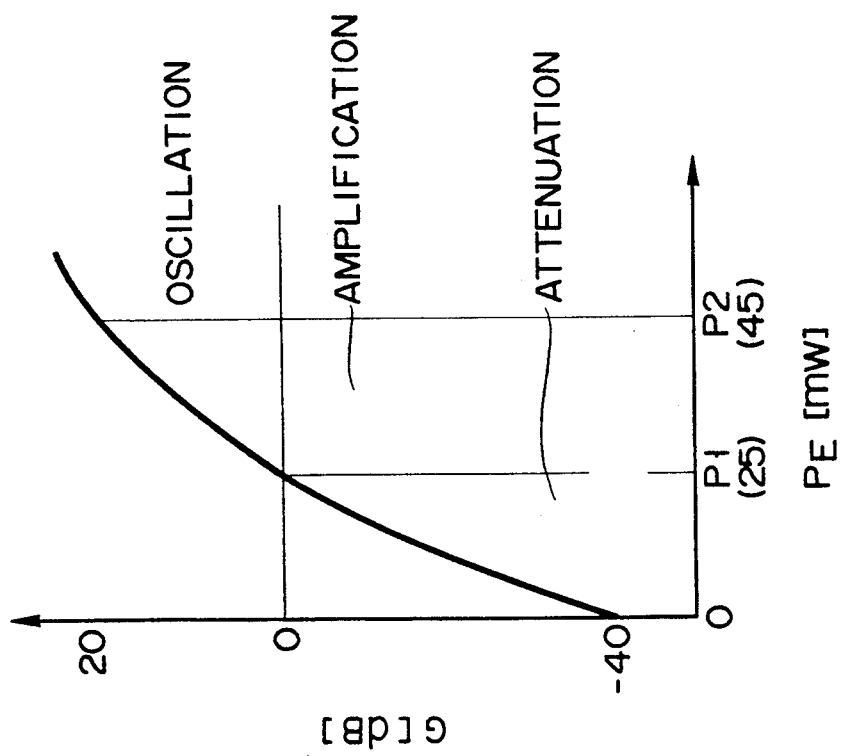
FIG. 12 shows an excited light power versus gain characteristic for explaining the operation of the third embodiment of the invention.

The operation of the third embodiment will now be described. When excitation light is applied to the port 2 of the dichroic beamsplitter 31, the inside of the rare-earth-doped optical fiber has an inverted electron distribution as shown in FIG. 4B. In this state, if signal light is applied to the port 1 of the dichroic beamsplitter 31, the signal light is amplified by virtue of the stimulated emission as shown in FIG. 4D. The output from the light amplifier 30 includes, in addition to an amplified light component, an excitation light component and a spontaneous emission light component (see FIG. 4C) emitted from the fiber itself. The excitation light component and the spontaneous emission light component are not necessary and are removed by the light filter 34 as noise, as compared to the signal light. FIG. 12 shows an excitation light power versus gain characteristic of the light amplifier 30. An attenuation region is obtained when the light power is lower than $P_1$, an amplification region is obtained in a range between $P_1$ to $P_2$, and an oscillation region is obtained when the light power is higher than $P_2$. When the semiconductor laser is used as the excitation light source 32, a proportional relationship is found in the current versus light output characteristic of the semiconductor laser, as shown in FIG. 13. Thus, the current versus gain characteristic of the light amplifier 30 is similar to that shown in FIG. 5. Therefore, the semiconductor laser is easily applicable to the present invention. The reflectivities $R_1$ and $R_2$, appearing in equation (2), correspond to the reflectances of both end portions of the rare-earth doped optical fiber serving as an amplification medium. The values of the reflectances are determined by the difference in refractive index between the rare-earth doped optical fiber and a conventional optical fiber connected thereto.

As has been described above in detail, the optical time domain reflectometer (OTDR) according to the present invention comprises an optical element functioning as a light source when light pulses are generated, and functioning as a light amplifier or a light attenuator when reflected light from an optical fiber is received, and a controller for controlling the mode of operation of the optical element. While reflected light is received, the optical element is used in the light amplification mode. In this time period, the optical element is operated in the attenuation mode at a desired time just after the generation of a light pulse, in which mode the reflected light from the optical fiber is masked. Thus, Fresnel's reflection light occurring at the fault point of the fiber is attenuated, and a peculiar point existing just after the fault point can be exactly observed.

In addition, the use of the two-part optical element can prevent the light-receiver from being saturated at the time of light pulse generation.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An optical time domain reflectometer comprising:
   an optical element having three operation modes of light oscillation, light amplification, and light attenuation, which are switched in accordance with the intensity of an excitation component, said optical element having a first light terminal from which a light pulse is output to an optical fiber to be tested, and a second light terminal through which reflected light from the optical fiber is passed in the amplification mode or in the attenuation mode;
   light-receiving means for receiving the reflected light output from the second light terminal of the optical element, and converting the reflected light into an electric signal;
   signal processing means for subjecting the electric signal output from the light-receiving means to a predetermined signal processing step for testing the optical fiber; and
   excitation component control means for outputting to the optical element a first excitation component for enabling the optical element to operate in the oscillation mode at a first timing, a second excitation component for enabling the optical element to operate in the attenuation mode at a second timing subsequent to the first timing, and a third excitation component for enabling the optical element to operate in the amplification mode at a third timing subsequent to the second timing.

2. The optical time domain reflectometer according to claim 1, wherein said optical element includes a semiconductor laser amplifier.

3. The optical time domain reflectometer according to claim 2, wherein said semiconductor laser amplifier includes a two-part semiconductor laser amplifier.

4. The optical time domain reflectometer according to claim 1, wherein said optical element incudes a fiber type light amplifier.

5. The optical time domain reflectometer according to claim 1, wherein said reflectometer further comprises command means for issuing a command to the excitation component control means thereby enabling the excitation component control means to output a fourth excitation component to the optical element, whereby the optical element is allowed to operate in the attenuation mode at least at a desired timing while the third excitation component is being supplied to the optical element.

6. The optical time domain reflectometer according to claim 2, wherein the reflectance of that portion of the semiconductor laser amplifier, which faces the light-receiving means, is higher than the reflectivity of that portion of the semiconductor amplifier, which faces the optical fiber to be tested.

7. The optical time domain reflectometer according to claim 4, wherein said fiber type light amplifier includes a rare-earth doped optical fiber type light amplifier.

8. The optical time domain reflectometer according to claim 2, wherein said excitation component control means includes means for controlling injected currents to be injected to the semiconductor laser amplifier as the first, second, and third excitation components.

9. The optical time domain reflectometer according to claim 5, wherein said excitation component control means includes means for controlling injected currents to be injected to the semiconductor laser amplifier as the first, second, third, and fourth excitation components.

10. The optical time domain reflectometer according to claim 4, wherein said excitation component control means includes means for controlling excitation light to be excited to the fiber type amplifier as the first, second, and third excitation components.

* * * * *